United States Patent
Sano et al.

(10) Patent No.: US 6,912,602 B2
(45) Date of Patent: Jun. 28, 2005

(54) SYSTEM HAVING TWO OR MORE PACKET INTERFACES, A SWITCH, AND A SHARED PACKET DMA CIRCUIT

(75) Inventors: Barton J. Sano, Fremont, CA (US);
Koray Oner, Sunnyvale, CA (US);
Laurent R. Moll, Satatoga, CA (US);
Manu Gulati, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 48 days.

(21) Appl. No.: 10/269,666

(22) Filed: Oct. 11, 2002

(65) Prior Publication Data

US 2003/0097498 A1 May 22, 2003

Related U.S. Application Data

(60) Provisional application No. 60/380,740, filed on May 15, 2002, provisional application No. 60/348,777, filed on Jan. 14, 2002, provisional application No. 60/348,717, filed on Jan. 14, 2002, provisional application No. 60/344,713, filed on Dec. 24, 2001, and provisional application No. 60/331,789, filed on Nov. 20, 2001.

(51) Int. Cl.[7] ............................................. G06F 13/28
(52) U.S. Cl. .............................. 710/22; 710/52; 710/38; 709/212; 709/250
(58) Field of Search ..................... 710/22, 52, 62, 710/36, 38, 308, 305, 5; 709/217, 220, 223, 250, 212

(56) References Cited

U.S. PATENT DOCUMENTS

| | | |
|---|---|---|
| 4,788,679 A | 11/1988 | Kataoka et al. |
| 5,644,753 A | 7/1997 | Ebrahim et al. |
| 5,764,895 A * | 6/1998 | Chung .................... 709/250 |
| 5,805,590 A | 9/1998 | Gillard et al. |
| 5,963,745 A | 10/1999 | Collins et al. |

(Continued)

FOREIGN PATENT DOCUMENTS

| | | |
|---|---|---|
| DE | 199 07 200 | 2/1999 |
| EP | 265 636 | 10/1986 |
| EP | 893 766 | 1/1999 |
| EP | 920 157 | 6/1999 |
| EP | 777 179 | 5/2002 |
| WO | 98/15155 | 4/1998 |
| WO | WO 00/38069 | 6/2000 |

OTHER PUBLICATIONS

EP Search Report for EP app 02025691.3, Feb. 13, 2003, Broadcom Corp.

(Continued)

*Primary Examiner*—Kim Huynh
(74) *Attorney, Agent, or Firm*—Garlick Harrison & Markison LLP

(57) ABSTRACT

An apparatus includes a first interface circuit, a second interface circuit, a memory controller for configured to interface to a memory, and a packet DMA circuit. The first interface circuit is configured to couple to a first interface for receiving and transmitting packet data. Similarly, the second interface circuit is configured to couple to a second interface for receiving and transmitting packet data. The packet DMA circuit is coupled to receive a first packet from the first interface circuit and a second packet from the second interface circuit. The packet DMA circuit is configured to transmit the first packet and the second packet in write commands to the memory controller to be written to the memory. In some embodiments, a switch is coupled to the first interface circuit, the second interface circuit, and the packet DMA circuit.

13 Claims, 12 Drawing Sheets

U.S. PATENT DOCUMENTS

| | | | |
|---|---|---|---|
| 5,991,824 A * | 11/1999 | Strand et al. ................... | 710/1 |
| 6,009,426 A | 12/1999 | Jouenne et al. | |
| 6,009,527 A * | 12/1999 | Traw et al. .................. | 713/200 |
| 6,094,715 A | 7/2000 | Wilkinson et al. | |
| 6,108,739 A | 8/2000 | James et al. | |
| 6,128,728 A | 10/2000 | Dowling | |
| 6,138,217 A | 10/2000 | Hamaguchi | |
| 6,185,520 B1 | 2/2001 | Brown et al. | |
| 6,195,739 B1 | 2/2001 | Wright et al. | |
| 6,226,338 B1 * | 5/2001 | Earnest ....................... | 375/372 |
| 6,266,731 B1 | 7/2001 | Riley et al. | |
| 6,279,052 B1 * | 8/2001 | Upadrastra ................... | 710/22 |
| 6,298,370 B1 | 10/2001 | Tang et al. | |
| 6,526,451 B2 * | 2/2003 | Kasper ....................... | 709/250 |
| 6,651,131 B1 * | 11/2003 | Chong et al. ............... | 710/317 |
| 6,691,185 B2 * | 2/2004 | Avery .......................... | 710/52 |

OTHER PUBLICATIONS

Giorgi et al.; PSCR: A Coherence Protocol for Eliminating Passive Sharing in Shared–Bus Shared–Memory Multiprocessors; IEEE Transactions on Parallel and Distributed Systems; vol. 10, No. 7, Jul. 1999.

European Search Report for EP26056 (02025690.5–2415–) mailed Mar. 11, 2003, 3 pages.

Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

SiByte, "Target Applications," http://sibyte.com/mercurian/application.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, Jun. 13, 2000, 15 pages.

Jim Keller, "The Mercurian Processor: A High Performance, Power–Efficient CMP for Networking," Oct. 10, 2000, 22 pages.

Intel, "21143 PCI/CardBus 10/100Mb/s Ethernet LAN Controller," Hardware Reference Manual, Revision 1.0, Oct. 1998, 219 pages.

* cited by examiner

SYSTEM HAVING TWO OR MORE PACKET INTERFACES, A SWITCH, AND A SHARED PACKET DMA CIRCUIT

This application claims benefit of priority to U.S. Provisional Patent Application Ser. No. 60/380,740, filed May 15, 2002. This application claims benefit of priority to U.S. Provisional Patent Application Ser. No. 60/331,789, filed Nov. 20, 2001. This application claims benefit of priority to U.S. Provisional Patent Application Ser. No. 60/344,713, filed Dec. 24, 2001. This application claims benefit of priority to U.S. Provisional Patent Application Ser. No. 60/348,777, filed Jan. 14, 2002. This application claims benefit of priority to U.S. Provisional Patent Application Ser. No. 60/348,717, filed Jan. 14, 2002.

BACKGROUND OF THE INVENTION

1. Field of the Invention

This invention is related to the field of packet processing and, more particularly, to receipt and transmission of packets on multiple interfaces.

2. Description of the Related Art

As computer systems and other electronic systems become increasingly networked, packet processing has become increasingly important as well. Generally, packets are used to communicate among networked computer and electronic systems. Thus, each networked system must receive and transmit packets, and must process the packets directed to that system to determine what is being transmitted to that system.

Typically, each system includes one or more interfaces on which packets are transmitted and received. Additionally, each interface generally includes a dedicated DMA engine used to transmit received packets to memory in the system and to read packets from the memory for transmission. If a given system includes two or more packet interfaces, the system includes DMA engines for each interface.

SUMMARY OF THE INVENTION

An apparatus includes a first interface circuit, a second interface circuit, a memory controller for configured to interface to a memory, and a packet direct memory access (DMA) circuit. The first interface circuit is configured to couple to a first interface for receiving and transmitting packet data. Similarly, the second interface circuit is configured to couple to a second interface for receiving and transmitting packet data. The packet DMA circuit is coupled to receive a first packet from the first interface circuit and a second packet from the second interface circuit. The packet DMA circuit is configured to transmit the first packet and the second packet in write commands to the memory controller to be written to the memory. In some embodiments, a switch is coupled to the first interface circuit, the second interface circuit, and the packet DMA circuit. The switch is configured to selectively couple the first interface circuit and the second interface circuit to the packet DMA circuit for transmitting/receiving packet data to/from the packet DMA circuit. A computer accessible medium comprising one or more data structures representing the apparatus is also contemplated.

A method is contemplated. A first packet is received in a first interface circuit that is coupled to a first interface for receiving and transmitting packet data. A second packet is received in a second interface circuit that is coupled to a second interface for receiving and transmitting packet data. The first packet is transmitted from the first interface circuit to a packet DMA circuit, and the second packet is transmitted from the second interface circuit to the packet DMA circuit. The packet DMA circuit generates one or more write commands to a memory controller to write the first packet and the second packet to a memory coupled to the memory controller.

BRIEF DESCRIPTION OF THE DRAWINGS

The following detailed description makes reference to the accompanying drawings, which are now briefly described.

Figure 1:
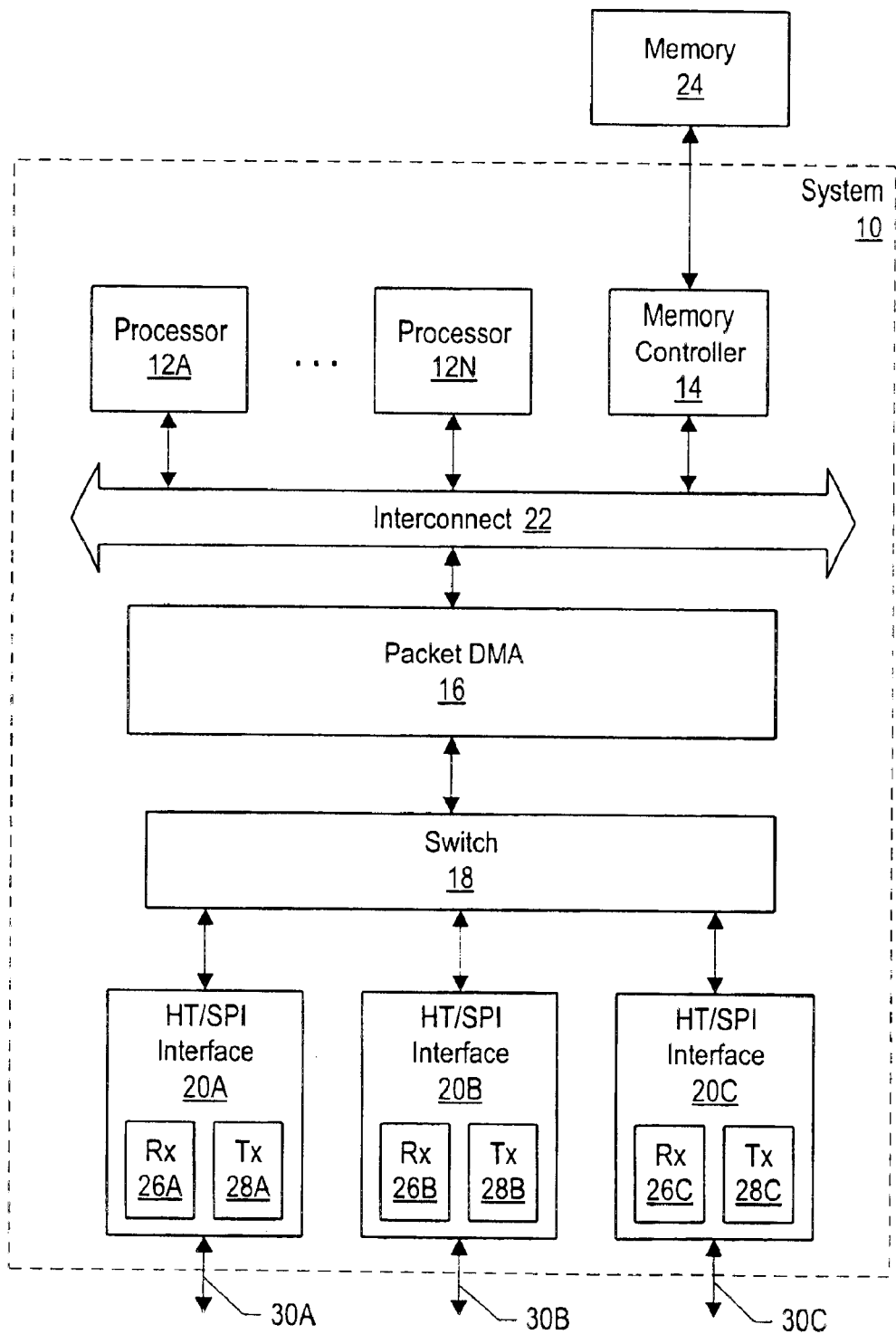
FIG. 1 is a block diagram of one embodiment of a system for packet processing.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the embodiment of FIG. 1, the system 10 includes one or more processors 12A–12N, a memory controller 14, a packet DMA circuit 16, a switch 18, and a set of interface circuits 20A–20C. The system 10 includes an interconnect 22 to which the processors 12A–12N, the memory controller 14, and the packet DMA circuit 16 are coupled. The system 10 is coupled, through the memory controller 14, to a memory 24. The interface circuits 20A–20C each include a receive (Rx) circuit 26A–26C and a transmit (Tx) circuit 28A–28C. The system 10 is coupled to a set of interfaces 30A–30C through respective interface circuits 20A–20C. The interface circuits 20A–20C are coupled to the switch 18, which is further coupled to the packet DMA circuit 16.

Each of the interface circuits 20A–20C are configured to receive and transmit packets on the respective interfaces 30A–30C to which they are connected. The Rx circuits 26A–26C handle the receiving of packets from the interfaces 30A–30C, and the Tx circuits 28A–28C handle the transmitting of packets on the interfaces 30A–30C.

Each of the interfaces 30A–30C is defined to carry packet data. For example, in some embodiments, the interfaces may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In other embodiments, the interfaces may be HyperTransport™ (HT) interfaces, which may carry packet data according to a Packet over HyperTransport (PoHT) extension to the HT interface. In the illustrated embodiment, each interface circuit 20A–20C may be configurable to communicate on either the SPI-4 interface or the HT interface. Each interface circuit 20A–20C may be individually programmable, permitting various combinations of the HT and SPI-4 interfaces as interfaces 30A–30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The interfaces may carry packet data directly (e.g. transmitting the packet data with various control information indicating the start of packet, end of packet, etc.) or indirectly (e.g. transmitting the packet data as a payload of a command, such as POHT).

The packet DMA circuit 16 comprises circuitry shared by the interface circuits 20A–20C. The packet DMA circuit 16 circuitry communicates packets between the interface circuits 20A–20C and the memory 24. The packet DMA circuit may generate write commands to the memory controller 14 to write received packets to the memory 24, and may generate read commands to read packets from the memory 24 for transmission by one of the interface circuits 20A–20C. In some embodiments, the packet DMA circuit 16 may be a more efficient use of hardware than having individual DMA engines for each of the interface circuits 20A–20C. Additionally, the packet DMA circuit may simplify communication on the interconnect 22, in some embodiments, for packet data transfers. It is noted that, in some embodiments, the system 10 may include an L2 cache coupled to the interconnect 22. The packet DMA circuit 16 may be configured, in some embodiments, to cause a portion of the packet data to be stored into the L2 cache in addition to being stored in memory. In some embodiments, the packet DMA circuit 16 may use descriptors to locate the memory locations for reading and writing packet data. The packet DMA circuit 16 may read and write the descriptors as well.

Packets stored to memory by the packet DMA circuit 16 may be processed by software executed by the processors 12A–12N. The software may determine that a given packet is terminated in the system 10. Alternatively, the processors 12A–12N may determine that the packet is to be retransmitted on one of the interfaces 30A–30C, and may prepare the packet for transmission by the packet DMA circuit 16. The packet may have been modified by software, or may be unmodified. Additionally, the software may generate packets to be transmitted. In any of these cases, the software may inform the packet DMA circuit 16 of the packet and its location in the memory 24, so that the packet DMA circuit 16 may read the packet from the memory 24 for transmission to the interface circuit 20A–20C coupled to the interface 30A–30C on which the packet is to be transmitted.

In some embodiments, the interface circuits 20A–20C may have dedicated communication paths to the packet DMA circuit 16. However, in the illustrated embodiment, the system 10 employs a switch 18. The switch 18 may selectively couple one of the interface circuits 20A–20C to the packet DMA circuit 16 to transfer received packet data to the packet DMA circuit 16. The switch 18 may selectively couple the packet DMA circuit 16 to one of the interface circuits 20A–20C to transfer packet data from the packet DMA circuit 16 to the interface circuits 20A–20C for transmission on the corresponding interface 30A–30C. The switch 18 may have request/grant interfaces to each of the interface circuits 20A–20C and the packet DMA circuit 16 for requesting transfers and granting those transfers. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

In one embodiment, the interfaces 30A–30C may support a set of virtual channels in which packets are transmitted. Each virtual channel is defined to flow independent of the other virtual channels, even though the virtual channels may share certain physical resources (e.g. the interface 30A–30C on which the packets are flowing). These virtual channels may be mapped to internal virtual channels (referred to as switch virtual channels herein). The switch may be virtual-channel aware. That is, the switch may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

As used herein, a "packet" may include any communication between a source and a destination which includes one or more headers defining the source and destination of the packet at various levels within the source and destination and which may include a data payload. "Packet data" may include any data that is part of a packet, or may refer to multiple packets.

The processors 12A–12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 10 may include any number of processors (e.g. as few as one processor, two processors, four processors, etc.).

The memory controller 14 is configured to access the memory 24 in response to read and write commands received on the interconnect 22. In some embodiments, an L2 cache may be coupled to the interconnect 22 for caching various blocks from the memory 24 for more rapid access by agents coupled to the interconnect 22. In such embodiments, the memory controller 14 may receive a hit signal from the L2 cache, and if a hit is detected in the L2 cache for a given read/write command, the memory controller 14 may not respond to that command. Generally, a read command causes a transfer of data from the memory 24 (although some read commands may be serviced from a cache such as an L2 cache or a cache in the processors 12A–12N) and a write command causes a transfer of data to the memory 24 (although some write commands may be serviced in a cache, similar to reads). The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the system 10 may include additional circuitry, not shown in FIG. 1. For example, the system 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the system 10 (and more particularly the processors 12A–12N, the memory controller 14, the interface circuits 20A–20C, the packet DMA circuit 16, the switch 18, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A–20C are illustrated in FIG. 1, two or more interface circuits may be implemented in various embodiments.

Figure 2:
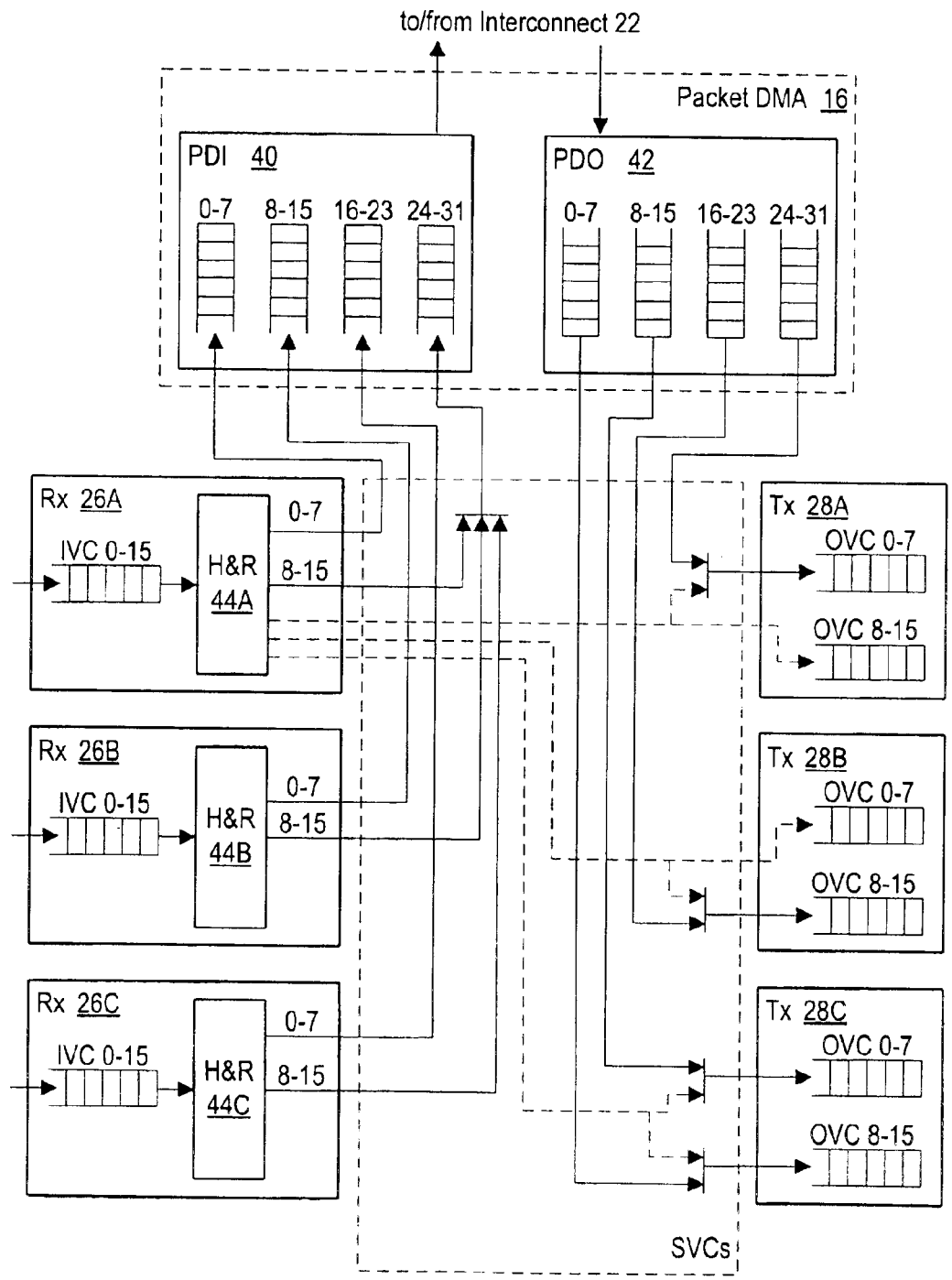
FIG. 2 is a block diagram illustrating one embodiment of virtual channels in the system of FIG. 1.

Turning now to FIG. 2, a block diagram illustrating one embodiment of virtual channels in the system 10 is shown. In the illustrated embodiment, the Rx circuits 26A–26C and the Tx circuits 28A–28C are shown. Additionally, the packet DMA circuit 16 is shown as including an input packet DMA circuit (PDI) 40 and an output packet DMA circuit (PDO) 42. The PDI 40 is coupled to transmit write commands on the interconnect 22 to write received packets to memory. The PDO 42 is coupled to transmit read commands on the interconnect 22 and to receive the read data comprising packets to be transmitted from the system 10.

Each Rx circuit 26A–26C supports a set of input virtual channels (IVCs) defined by the interface from which the Rx circuit receives packet data. For example, the SPI-4 interface and the HT interface may both support 16 virtual channels in hardware (although more may be used by software in the SPI-4 interface, since an 8 bit virtual channel value is supported). Thus, each Rx circuit 26A–26C supports 16 IVCs (numbered 0–15 in FIG. 2). Similarly, each Tx circuit 28A–28C supports 16 output virtual channels (OVCs), numbered 0–15 in FIG. 2. Other embodiments may employ more or fewer IVCs and OVCs according to the interfaces supported by those embodiments. The PDI 40 includes a logical set of input queues (e.g. 32 in the illustrated embodiment, numbered 0–31, although more or fewer input queues may be included in other embodiments). The PDO 42 includes a logical set of output queues (e.g. 32 in the illustrated embodiment, numbered 0–31, although more or fewer output queues may be included in other embodiments).

Each Rx circuit 26A–26C includes a H&R circuit 44A–44C in the illustrated embodiment, which maps packets from the IVCs to a switch virtual channel (SVC). The SVC is used as the internal virtual channel for the system 10, and in particular is used to transmit packets through the switch 18 to the packet DMA circuit 16 or to the Tx circuits 28A–28C. Viewed in another way, requests to transmit packet data through the switch 18 are made based on the SVC of the packet, which identifies both the destination of the packet and the virtual channel at the destination. The SVC may also be referred to herein as a destination and the virtual channel at the destination.

In the illustrated embodiment, the H&R circuits 44A–44C may map the IVCs to one of 16 PDI VCs (numbered 0–15 in FIG. 2, using solid lines from the H&R circuits 44A–44C). These PDI VCs may be further mapped to input queues in the PDI 40, e.g. using a register to which the H&R circuit 44A is coupled (see FIG. 3 below). That is, VCs at the PDI 40 may correspond directly to input queues, or input queues may each be a VC in the PDI 40. In the illustrated embodiment, PDI VCs are mapped to input queues in blocks of eight (e.g. PDI VC 0 is either input queue 0, 8, 16, or 24; PDI VC 1 is either input queue 1, 9, 17, or 25; etc.). In other embodiments, each PDI VC may be individually mappable to an input queue, or other sized blocks of input queues may be mappable to PDI VCs. In yet another embodiment, the H&R circuits 44A–44C may directly map IVCs to PDI input queues (e.g. without the intermediate step of PDI VCs). Additionally, the H&R circuits 44A–44C may map packets from an IVC to an OVC in one of the Tx circuits 28A–28C, illustrated for H&R circuit 44A with dashed lines through the SVCs block to the Tx circuits 28A–28C.

The H&R circuits 44A–44C may be used to split packets from the same IVC to different SVCs (e.g. different input queues in the PDI and/or OVCs in the Tx circuits 28A–28C). Thus, the H&R circuits 44A–44C may provide software flexibility to separate packets for processing versus packets to be passed through the Tx circuits 28A–28C based on various packet attributes (such as header values), or may provide for separating packets into different input queues in the PDI 40 (e.g. for different types of processing) based on various packet attributes. The H&R circuits 44A–44C may also be programmed to map IVCs to SVCs without using any additional packet attributes, or a combination of such mappings and other mappings using additional packet attributes, as desired. In other embodiments, the Rx circuits 26A–26B may not include H&R circuits and may instead use a programmable or fixed mapping of each IVC to a specified SVC (Tx circuit 28A–28C and OVC in that circuit or PDI 40 and an input queue in the PDI 40). It is noted that packets which are routed from an Rx circuit 26A–26C directly to a Tx circuit 26A–26C bypass the packet DMA circuit 16, the memory 24, and processing by the processors 12A–12N.

The PDO 42 output queues are also mapped to various Tx circuits 28A–28C and to OVCs in those Tx circuits 28A–28C. In the illustrated embodiment, output queues are mapped to Tx circuits and OVCs in blocks of 8, similar to the mapping of IVCs to input queues. Other embodiments may map output queues individually, or in other-sized blocks, as desired. In one embodiment, the PDO 42 includes a configuration register or registers programmed with the mapping of each block of 8 output queues to a corresponding group of SVCs (which identify the Tx circuit 28A–28C and the OVC within that Tx circuit) (see, e.g., FIG. 5). Other embodiments may use more elaborate mapping mechanisms similar to H&R circuits, to map packets based on packet attributes in addition to output queues, if desired.

FIG. 2 illustrates, via the solid arrows between the H&R circuits 44A–44C and the PDI 40, an exemplary mapping from the PDI VCs of the H&R circuits 44A–44C to the input queues of the PDI 40. The exemplary mapping is but one example of the mappings that may be used, as programmed into the Rx circuits 26A–26C by software. In the example, PDI VCs 0–7 from the H&R circuit 44A are mapped to input queues 0–7; PDI VCs 0–7 from the H&R circuit 44B are mapped to input queues 8–15; PDI VCs 0–7 from the H&R circuit 44C are mapped to input queues 16–23; and PDI VCs 8–15 from each of the H&R circuits 44A–44C are merged to input queues 24–31. When mappings merge the PDI VCs from different H&R circuits 44A–44C, the switch 18 may perform the merging on packet boundaries. That is, when a given Rx circuit 26A–26C has been granted to transfer a packet to an input queue that is merged among the Rx circuits 26A–26C, the switch inhibits granting any other Rx circuit 26A–26C on that input queue until the granted Rx circuit 26A–26C reaches a packet boundary. Any combination of PDI VCs from different Rx circuits 26A–26C may be merged into input queues, as desired in various mappings.

FIG. 2 also illustrates, via the solid arrows between the PDO 42 and the Tx circuits 28A–28C, an exemplary mapping of output queues to Tx circuits and OVCs. The exemplary mapping is but one example of mappings that may be used, as programmed by software. In the illustrated mapping, output queues 0–7 are mapped to OVCs 8–15 in the Tx circuit 28C; output queues 8–15 are mapped to OVCs 0–7 in the Tx circuit 28C; output queues 16–23 are mapped to OVCs 8–15 in the Tx circuit 28B; and output queues 24–31 are mapped to OVCs 0–7 in the Tx circuit 28A. Additionally, Rx circuits 26A–26C may map IVCs to OVCs, and thus there may be merging of packets from Rx circuits 26A–26C and output queues to an OVC. Again, the switch 18 may handle this merging on packet boundaries.

The input queues of the PDI 40 and the output queues of the PDO 42 may be logical queues. That is, the queues may actually be implemented in memory 24. The PDI 40 and the PDO 42 may include buffers to buffer the packet data being transmitted to and from the memory 24. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g. linked lists, contiguous memory locations for memory buffers for packet data, etc.).

It is noted that, while the Rx circuits 26A–26C and the Tx circuits 28A–28C are described as supporting various virtual channels for packets, in some embodiments these circuits may support additional virtual channels for other types of traffic. For example, the HT interface is capable of carrying non-packet traffic (e.g. I/O traffic) in additional virtual channels. Additionally, in one embodiment, the HT interface may support coherent virtual channels for transactions used to maintain coherency among devices on the HT interface. The Rx circuits 26A–26C and the Tx circuits 28A–28C may be designed to additionally route data received on these VCs according to the HT definition and/or coherency requirements.

Figure 3:
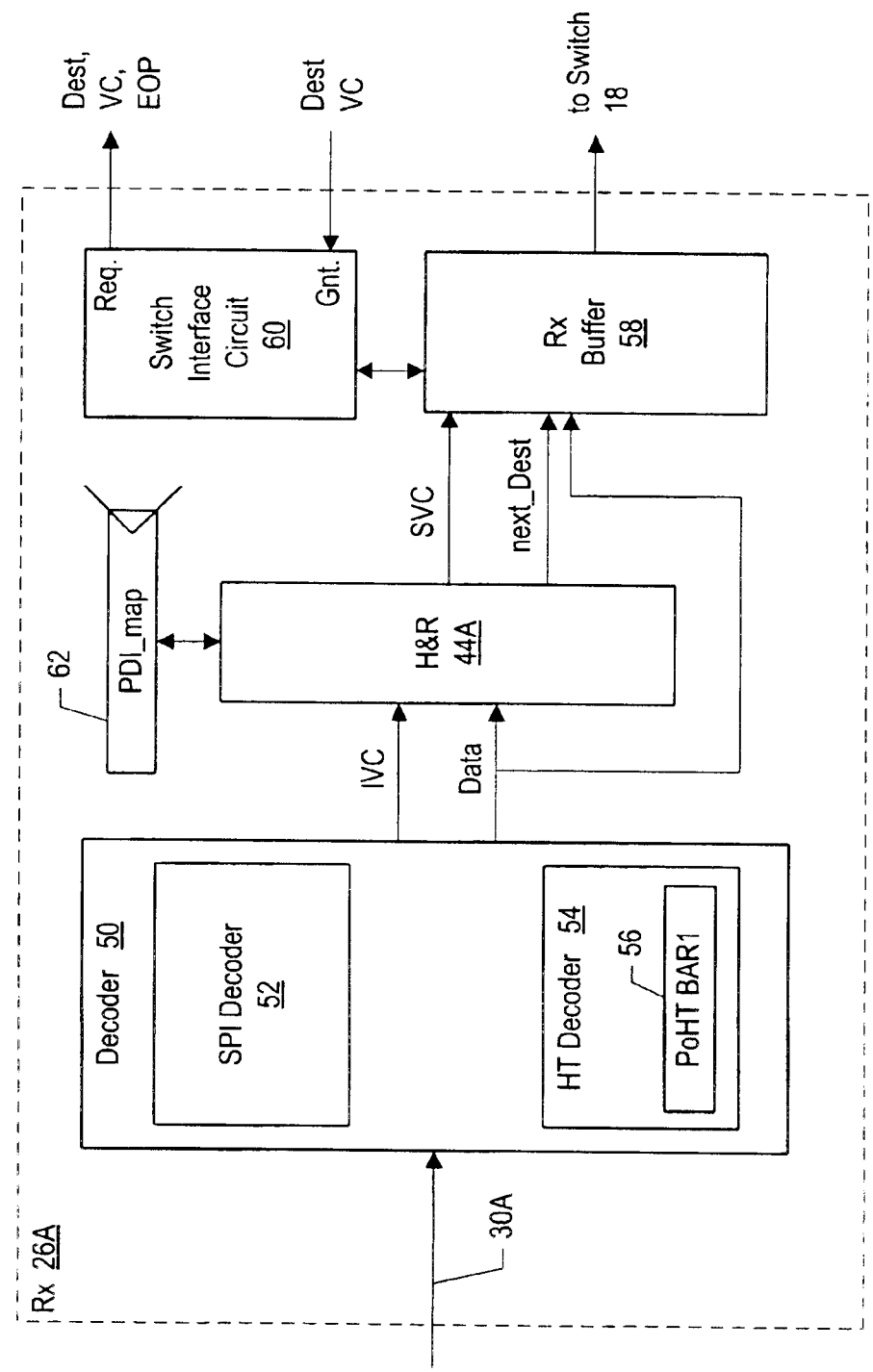
FIG. 3 is a block diagram of one embodiment of a receiver circuit shown in FIG. 1.

Turning next to FIG. 3, a more detailed diagram of a portion of one embodiment of the Rx circuit 26A is shown. Other Rx circuits 26B–26C may be similar. In the embodiment of FIG. 3, the Rx circuit 26A includes a decoder 50 (which includes a SPI decoder 52 and an HT decoder 54 including a PoHT BAR1 register 56), the H&R circuit 44A, an Rx buffer 58, a switch interface circuit 60, and a PDI_map register 62. The decoder 50 is coupled to receive input data on the interface 30A, and is coupled to provide an IVC and the packet data to the H&R circuit 44A. The decoder 50 is also coupled to provide the packet data to the Rx buffer 58 for storage. The H&R circuit 44A is configured to generate an SVC and optionally a next destination (next_dest) value, which are received by the Rx buffer 58. The Rx Buffer 58 is coupled to the switch 18 (particularly the data path of the switch 18) and is coupled to the switch interface circuit 60. The H&R circuit 44A is coupled to the PDI_map register 62 as well.

The decoder 50 receives the input data from the interface 30A and decodes the data according to the SPI specification (in the SPI decoder 52) or the HT specification (in the HT decoder 54). One of the decoders 52 and 54 is active dependent on which interface 30A the Rx circuit 26A is coupled to. The active decoder 52 or 54 may be selected in any desired fashion. The PoHT extension to the HT interface defines an address range (stored in the PoHT BAR1 register 56) to which HT sized-write commands may be directed in order to transmit packet data. The IVC may be carried in the sequence ID field of the HT packet, and the least significant bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR1 register, the HT packet is a PoHT packet and the data transmitted with the sized write is packet data.

The decoder 50 provides the IVC of the packet and the received packet data to the H&R circuit 44A. The H&R circuit 44A may select bytes of the packet data and/or the IVC and generate a corresponding SVC. While the H&R circuit may implement any hashing and mapping function, in one embodiment the H&R circuit may support a number of programmable rules. Each rule selects bytes from the data (or the IVC) and compares the selected data to an operand of the rule. Each rule may be evaluated on packet data and the true/false results of each comparison may be input to a path table. The path table includes entries which search for selected true or false results from the rules, and outputs path data from a matching entry. The path data may be an SVC, may be an index to a route table which outputs an SVC, or may select the output of a hash function or an extract function as the index to the route table (added to a base address which is also part of the path data). Additionally, for HT interfaces, a next_dest may be output. The next_dest value indicates, to a Tx circuit 28A–28C on an HT interface, which base address to select from a table of base addresses for the write command comprising the PoHT packet. If the SVC indicates a PDI VC, the H&R circuit 44A may further use the mapping specified in the PDI_map register 62 to map the PDI VC to an input queue of the PDI 40.

The packet data and the SVC output by the H&R circuit 44A are stored in the Rx buffer 58. The Rx buffer 58 may include storage for each IVC, which may be programmably allocated to the IVCs using configuration registers (not shown).

The switch interface circuit 60 may scan the packets stored in the Rx buffer 58 and generate requests for the switch 18. A request includes the SVC of the packet (the destination, e.g. the PDI 40 or one of the Tx circuits 28A–28C, and the virtual channel, e.g. the input queue for the PDI 40 or the OVC for the Tx circuits 28A–28C). The request may also include an end of packet indication (EOP) to indicate to the switch that the request, when granted, will be the end of the packet currently being transmitted by the Rx circuit 26A on the requested SVC. In some embodiments, the request may also include other information such as error status of the packet, switch ID, etc. The request may also include a valid indication indicating whether or not a request is being made. When the switch grants the request, the switch returns the granted SVC to the switch interface circuit 60 (i.e. destination that is granted and the input queue or OVC at that destination that is granted). The grant may further include a valid indication indicating whether or not a grant is being given.

In one embodiment, the switch 18 grants one transfer through the switch per request. For example, in one implementation, 16 bytes of data may be transferred through the switch from one source to one destination in one transfer. Thus, multiple requests and grants for the same SVC may be used to transmit a packet to a given destination if the packet is larger than one transfer through the switch. The EOP indication does not indicate end of packet until the last request is made. The switch 18, once a given VC in a destination is granted to a source, inhibits granting other sources to that VC and destination until the EOP indication is received in a request from the granted source.

In response to a grant, the switch interface circuit 60 may cause the Rx buffer 58 to transfer the next 16 bytes of the packet corresponding to the granted SVC. The Rx buffer 58 may free the storage from which the 16 bytes were read in response to transferring the data through the switch 18.

It is noted that, while 16 bytes is used as an example above of one transfer through the switch 18, other embodiments may employ any size for the transfer. Transfers through the switch may also include, in addition to the data bytes being transferred, one or more bits of tag data carrying other information related to the data. For example, in some embodiments, tag data may include one or more of the following: a start of packet indication, an indication of the source, the IVC, the next_dest value, miscellaneous HT data from the PoHT write command, packet status (e.g. error or source generated error), etc. In some embodiments, the switch may support a reload interface by which a granted source or destination may request that the granted request be reloaded as another request (e.g. if the source has more data on that SVC to transmit or the destination has more space in that VC to receive data).

Figure 4:
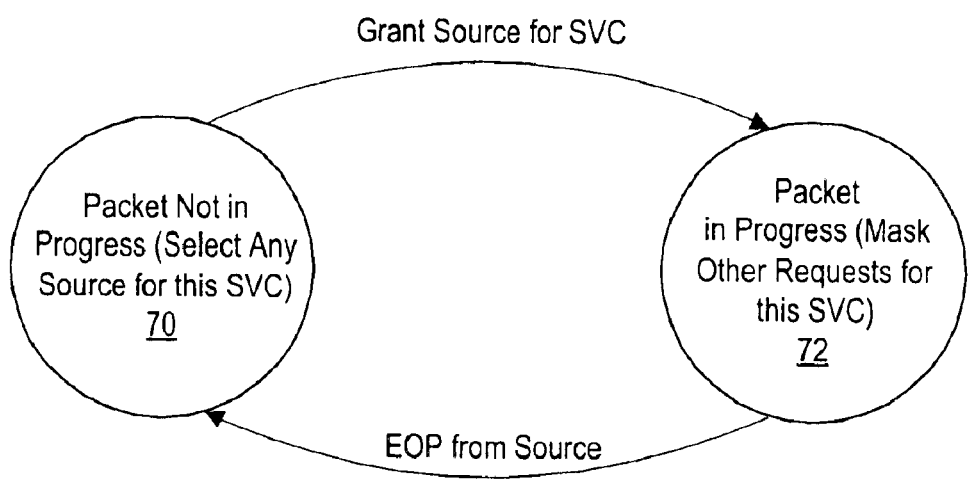
FIG. 4 is a state machine diagram illustrating one embodiment of packet boundary aware switching.

Turning next to FIG. 4, a state machine diagram is shown which illustrates operation of one embodiment of the switch with respect to one SVC (one destination and input queue or OVC at that destination). A similar state machine may apply to each SVC.

In the packet not in progress state 70, the switch 18 may select any source to transfer data on the SVC. In state 70, the switch 18 may use any selection mechanism to select among requesters for the SVC. In one embodiment, the switch 18 uses a round robin selection scheme for the PDI 40 input queues and uses a programmable weighted round robin with priority scheme for the Tx circuits 28A–28C. In the programmable weighted round robin with priority scheme, each source may be programmed as high priority or low priority, and may be given a weight. In one implementation, the switch maintains deficit counters indicating how many transfers each source has not been able to transfer (based on its weight) on the SVC, and selects the requesting source with the highest deficit.

Once a source has been selected, the switch 18 transitions to the packet in progress state 72. In this state, the switch 18 records the source that was granted for this SVC and masks requests from other sources. Thus, the source that was previously granted is the only source that will be granted on the SVC. The switch may grant other sources for other SVCs corresponding to the same destination (e.g. other input queues or other OVCs). The switch 18 remains in this state until a request is granted to the source and the EOP indication with the request indicates end of packet. The switch 18 then transitions to the state 70 and selects the next source.

Figure 5:
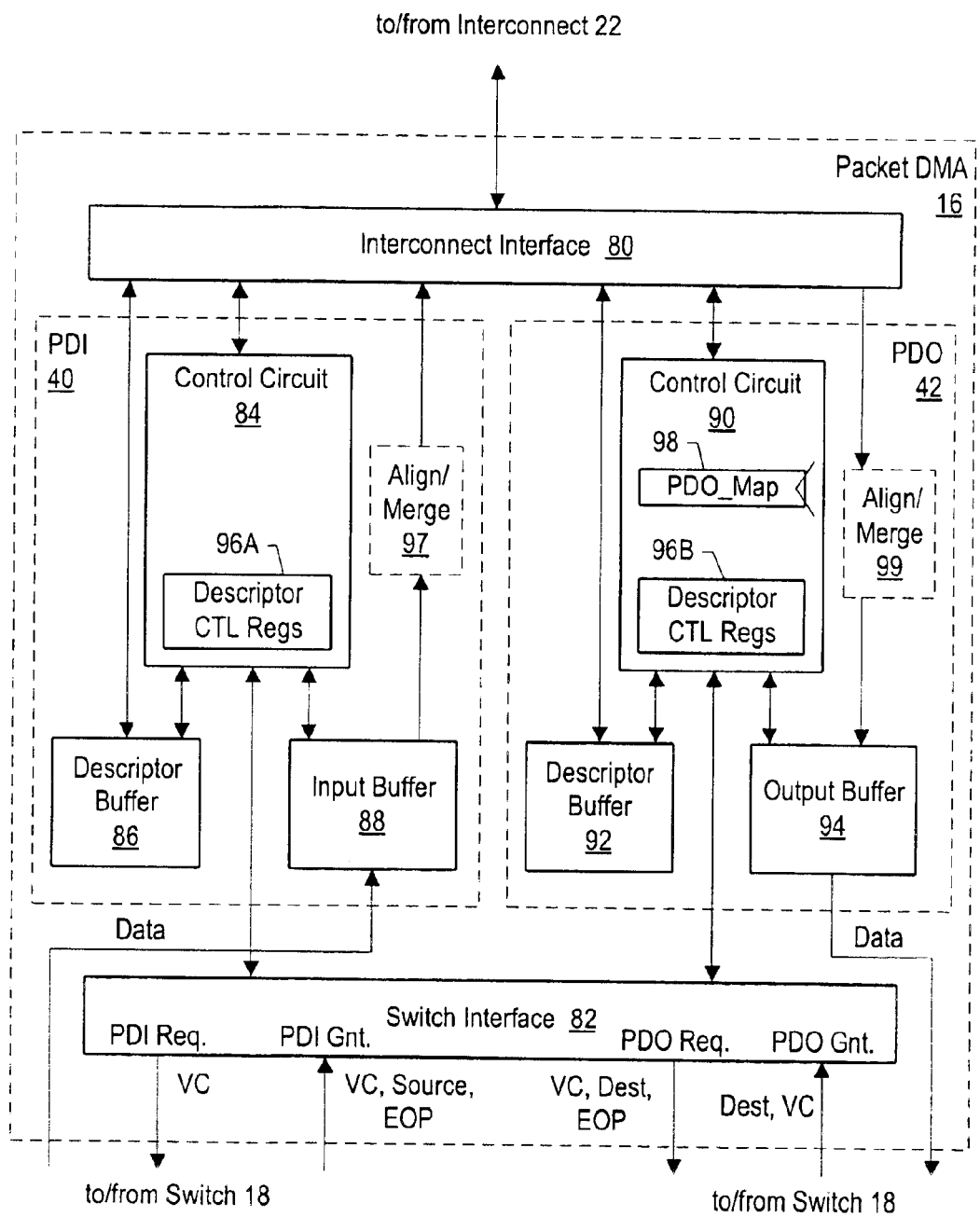
FIG. 5 is a block diagram of one embodiment of a packet DMA circuit.

Turning now to FIG. 5, a block diagram of one embodiment of the packet DMA circuit 16 is shown in greater detail. In the embodiment of FIG. 5, the packet DMA circuit 16 includes an interconnect interface circuit 80 for communicating on the interconnect 22, the PDI 40, the PDO 42, and a switch interface circuit 82. The PDI 40 includes a control circuit 84, a descriptor buffer 86, and an input buffer 88. The PDO 42 includes a control circuit 90, a descriptor buffer 92, and an output buffer 94. The control circuit 84 includes a set of descriptor control registers 96A, and the control circuit 90 similarly includes a set of descriptor control registers 96B. Additionally, the control circuit 90 includes a PDO_Map register 98. The interconnect interface 80 is coupled to the interconnect 22, the descriptor buffers 86 and 92, the control circuits 84 and 90, the input buffer 88, and the output buffer 94. The control circuit 84 is further coupled to the descriptor buffer 86, the input buffer 88, and the switch interface circuit

82. The input buffer 88 is coupled to receive data from the switch 18. The control circuit 90 is further coupled to the descriptor buffer 92, the output buffer 94, and the switch interface circuit 82. The output buffer 94 is coupled to provide data to the switch 18. The switch interface circuit 82 is coupled to request and grant interfaces to the switch 18 for the PDI 40 and the PDO 42.

Figure 6:
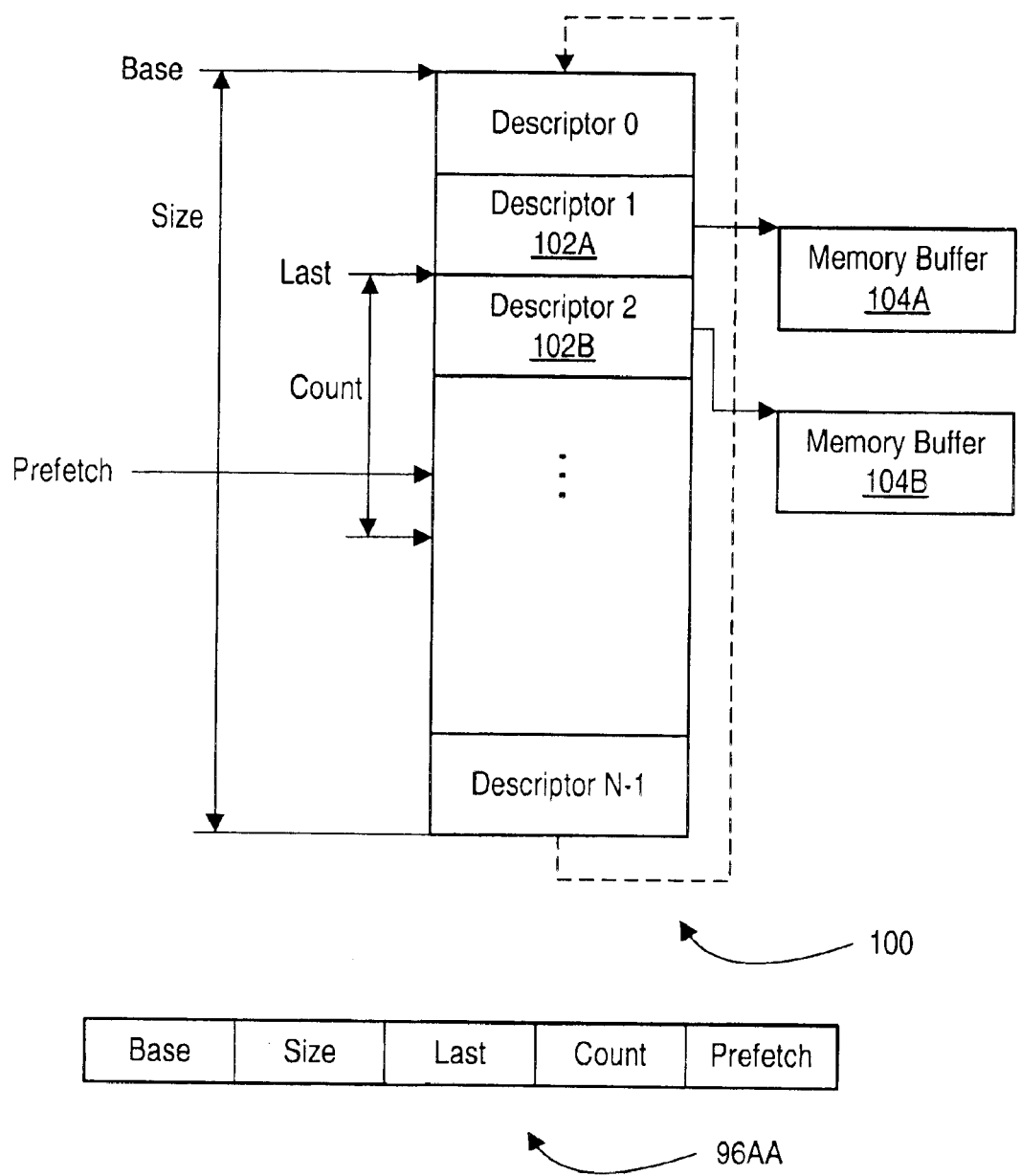
FIG. 6 is a block diagram of one embodiment of a set of descriptors and a corresponding descriptor control register or registers.

The control circuit 84 controls the transfer of packets from the interface circuits 20A–20C to the memory 24. As mentioned above, the PDI 40 includes a logical set of input queues to which packets may be transferred. Each input queue is implemented, in the present embodiment, via a descriptor ring in memory. The descriptor ring comprises a set of descriptors, each of which identifies a memory buffer in memory that may be used to store packet data for the corresponding input queue. One or more descriptors may be occupied by a given packet. An exemplary descriptor ring for one embodiment is shown in FIG. 6 and described in more detail below.

The control circuit 84 may prefetch one or more descriptors (the next descriptors in the ring that are to receive packet data) into the descriptor buffer 86. In one embodiment, for example, up to 8 descriptors may be prefetched for each input queue. If at least one descriptor is available to receive packet data in a given input queue, the control circuit 84 may signal the switch interface 82 to request a packet on that input queue. In one embodiment, two descriptors may comprise a cache block. In such an embodiment, if two descriptors are available, a prefetch of both descriptors may be generated as a combined command. If one or no descriptors are available, descriptor prefetching may be delayed until at least two descriptors are available.

The switch interface circuit 82 may request a packet for an input queue using the PDI request interface. The PDI request interface indicates which input queue (which VC) the PDI has space to store data in. The PDI request interface may also include a valid indication indicating whether or not a request is being made. The PDI request interface may be similar to other destination request interfaces (e.g. those used by the Tx circuits 28A–28C). The switch 18 may grant to a source and destination once both the source and the destination have requested a transfer on the same destination VC. The PDI grant interface indicates which source is transferring data, on which VC (which input queue) and whether or not the transfer is the end of the packet (EOP). The switch interface circuit 82 may signal the control circuit 84 when a grant has been received, and the control circuit 84 may cause the corresponding data to be stored in the input buffer 88. The input buffer 88 may include storage for each input queue, to temporarily store packet data until a write command is generated to write the packet data to the memory buffer selected for the packet. In some embodiments, the input buffer 88 may be configured to store less than a full packet for a given input queue.

Generally, the control circuit 84 may generate read commands to the interconnect interface circuit 80 to prefetch descriptors into the descriptor buffer 86. Additionally, the control circuit 84 may generate write commands to the interconnect interface circuit 80 to write data from the input buffer 88 to the memory buffer, and to write the descriptor back to memory after the descriptor has been used to store packet data. The interconnect interface circuit 80 may transmit the commands on the interconnect 22 and, in the case of reads, return data to the descriptor buffer 86. In one embodiment, the interconnect 22 may perform cache block sized transfers (where a cache block is the size of a cache line in caches within the system 10, e.g. 32 bytes in one embodiment). In such embodiments, if a write command does not write the entire cache block, the interconnect interface circuit 80 may perform a read-modify-write operation to perform the write. In one embodiment, descriptors may occupy one half of a cache block. In such embodiments, the packet DMA circuit 16 may attempt to delay the write of the first descriptor of a cache block to allow the second descriptor to also be written concurrently (thus avoiding a higher latency read-modify-write operation). The delay may be fixed or programmable, and the first descriptor may be written using a read-modify-write operation if the delay expires without a write of the second descriptor. The second descriptor may subsequently be written using a read-modify-write operation as well.

The control circuit 90 controls the transfer of packets from memory to the interface circuits 20A–20C. As mentioned above, the PDO 42 includes a logical set of output queues from which packets may be transferred. Each output queue is implemented, in the present embodiment, via a descriptor ring in memory, similar to the input queues. An exemplary descriptor ring for one embodiment is shown in FIG. 6 and described in more detail below.

The control circuit 90 may prefetch one or more descriptors (the next descriptors in the ring from which packet data is to be transmitted) into the descriptor buffer 92. In one embodiment, for example, up to 8 descriptors may be prefetched for each output queue. If at least one descriptor has packet data in a given output queue, the control circuit 90 may also prefetch the packet data into the output buffer 94. Once at least a switch transfer's worth of packet data has been read into the output buffer 94 for a given output queue, the control circuit 90 may signal the switch interface circuit 82 to request a transfer to the destination for that packet (one of the Tx circuits 28A–28C) for that output queue. In one embodiment, output queues are mapped to OVCs in the Tx circuits 28A–28C in groups of 8, as described above with respect to FIG. 2. The PDO_map register 98 may store the mappings, and thus the control circuit 90 may determine which destination and which OVC at that destination to request based on the mappings.

The switch interface circuit 82 may request a destination for an output queue using the PDO request interface. The PDO request interface may be similar to the request interface from the Rx circuits 26A–26C, and generally indicates which destination (which Tx circuit 28A–28C) and which VC (OVC) on the TX circuit 28A–28C that the PDO has packet data to transmit. In other words, the PDO request interface generally indicates the SVC that the PDO has packet data to transmit on. Additionally, if the requested transmission will include the end of the packet, the PDO request interface indicates such with the EOP indication. The PDO request interface may also include a valid indication indicating whether or not a request is being made, packet error status, etc. The PDO grant interface, again similar to the Rx grant interface, indicates which destination and VC is granted (e.g. which SVC is granted). The switch interface circuit 82 may signal the control circuit 90 when a grant has been received, and the control circuit 90 may cause the corresponding data to be read out of the output buffer 94 to the switch 18 (and ultimately to the destination Tx circuit 28A–28C).

Generally, the control circuit 90 may generate read commands to the interconnect interface circuit 80 to prefetch descriptors into the descriptor buffer 92 and to prefetch packet data into the output buffer 94. Additionally, the control circuit 90 may generate write commands to the interconnect interface circuit 80 to write the descriptor back to memory after the packet data from that descriptor has been read into the output buffer 94. The interconnect interface circuit 80 may transmit the commands on the interface and, in the case of reads, return data to the descriptor buffer 90 and the output buffer 94.

As mentioned above, the interconnect interface circuit 80 may include the circuitry for communicating on the interconnect 22. Additionally, in some embodiments, the interconnect interface circuit 80 may include buffers to store read and write commands until they can be transmitted on the interconnect.

In some embodiments, the PDI 40 may include an align/merge circuit 97 coupled between the input buffer 88 and the interconnect interface 80. In one embodiment, a memory buffer for packet data need not be aligned to a cache block boundary in the memory 24. The align/merge circuit 97 may align the packet data from the input buffer 88 to the offset specified in the descriptor. Additionally, the align/merge circuit 97 may merge switch transfers of data to fill a cache block, if the switch transfer width is less than a cache block in size. Similarly, the PDO 42 may include an align/merge circuit 99 coupled between the interconnect interface 80 and the output buffer 94. The align/merger circuit 99 may drop leading bytes from a cache block that are not part of a packet, and may merge data from multiple commands on the interconnect 22 to create a switch transfer's worth of data (e.g. 16 bytes, in one embodiment).

In some embodiments, various virtual channels may be used to ensure deadlock-free transfer on the interconnect 22. For example, in one embodiment, the PDI 40 may implement a nonposted command channel for descriptor prefetches; a posted command channel for descriptor write backs, packet data writes, and configuration/status register (CSR) read responses; a response channel for read data responses; and a CSR read/write channel for CSR read and write commands. In one embodiment, the PDO 42 may implement a nonposted command channel for descriptor prefetches and packet data fetches; a posted command channel for descriptor write backs and CSR read responses; and a response channel for read data responses; and a CSR read/write channel for CSR read/write commands.

An exemplary descriptor ring 100 is shown in FIG. 6, for one embodiment, along with a corresponding descriptor control register or registers 96AA (part of the descriptor control registers 96A). Descriptor rings may be similar for both the PDI 40 and the PDO 42. In the embodiment of FIG. 6, the descriptors are stored in a memory region defined by the base address ("base" field of the registers 96AA in FIG. 6) and the size ("size" field of the registers 96AA in FIG. 6). The base address points to the first descriptor (descriptor 0) in memory, and the size is an offset to the end of the last descriptor (descriptor N−1). The descriptors may be used in a ring. That is, descriptors may be used in consecutive order starting at descriptor 0 and proceeding to descriptor N−1. When the last descriptor N−1 has been used, the next descriptor to be used in descriptor 0 (indicated in FIG. 6 by the dashed line from descriptor N−1 to descriptor 0).

Each descriptor points to a memory buffer (that is, the descriptor includes the address of the memory buffer), and may also include various attributes of the memory buffer. For example, in FIG. 6, the descriptor 102A points to the memory buffer 104A and the descriptor 102B points to the memory buffer 104B.

The descriptors are made available to the packet DMA circuit 16 by software. Once the packet DMA circuit 16 has used a descriptor to store a packet (or reads the packet from the descriptor for transmission), the packet DMA circuit 16 returns the descriptor to software. In one embodiment, the packet DMA circuit 16 returns a descriptor to software by resetting a hardware (HW) bit in the descriptor, described in more detail below. Software sets up the descriptors in the descriptor ring, and writes the number of descriptors being made available to the count corresponding to that descriptor ring ("count" field in the registers 96AA in FIG. 6). The value written to the count field is added by the control circuit 84 to the value in the count field, resulting in the count of available descriptors. The "last" field in the registers 96AA in FIG. 6 is an index, measured from the base address, to the last descriptor that was used by the packet DMA circuit 16 and returned to software. Thus, the descriptors beginning with the next descriptor in the ring after the descriptor indicated by the "last" field and the following "count"−1 number of descriptors are available for packet DMA circuit use.

In one embodiment, the packet DMA circuit 16 may prefetch one or more descriptors. The "prefetch" field of the registers 96AA indicates the index, measured from the base address, of the most recently prefetched descriptor. Thus, the next descriptor to be prefetched may be the descriptor in the ring which follows the descriptor indicated by the prefetch field. Alternatively, the prefetch field may indicate the next descriptor to be prefetched. In one embodiment, the packet DMA circuit 16 does not attempt to prefetch a descriptor which has not been made available by software and thus the prefetch field may generally indicate a descriptor between the "last" descriptor and the descriptor corresponding to the "last" plus the "count".

Figure 7:
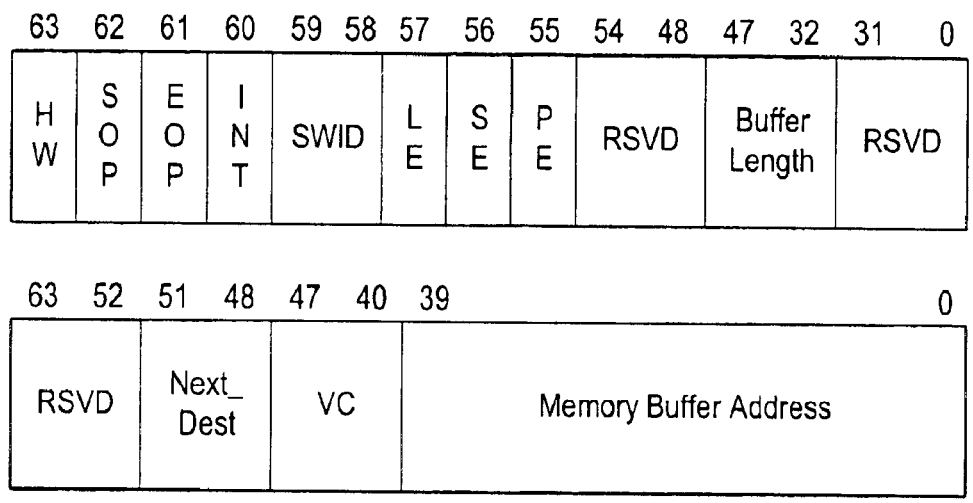
FIG. 7 is a block diagram of one embodiment of a descriptor.

FIG. 7 is a block diagram of one embodiment of a descriptor 102. In the embodiment of FIG. 7, the descriptor comprises 16 bytes illustrated as two 8 byte words. The bit ranges for the fields within each 8 bytes are shown above the fields. Fields labeled RSVD are reserved.

The descriptor 102 includes a variety of status information stored in bits 63:55 of the first 8 byte word. In particular, a hardware bit (HW) is included. Software may set the HW bit to indicate that the descriptor 102 is available for packet DMA circuit 16 use. The packet DMA circuit 16 may clear the HW bit to return the descriptor to software.

The SOP and EOP bits are used to indicate whether the memory buffer corresponding to the descriptor includes the start of the packet or the end of the packet. A packet may be stored in one or more memory buffers. If the memory buffer located by the descriptor 102 includes the start of a packet, the SOP bit is set. Otherwise, the SOP bit is clear. If the memory buffer includes the end of the packet, the EOP bit is set. Otherwise, the EOP bit is clear. Thus, if a packet is stored in one memory buffer, both the EOP and SOP bits in that descriptor are set. If a packet is stored in more than one memory buffer, the SOP bit in the descriptor corresponding to the first memory buffer is set and the EOP bit in the descriptor corresponding to the last memory buffer is set. Other EOP and SOP bits in the descriptors are clear. For input queue descriptors, the control circuit 84 sets or clears the EOP and SOP bits when writing the updated descriptor back to memory after writing packet data into the memory buffer. For output queue descriptors, software sets or clears the EOP and SOP bits when generating the descriptors for the packets. In some embodiments, having both the EOP and SOP bits in the descriptors may reduce traffic when packet processing is performed by multiple processors. For example, if the processor searches backward in the descriptor ring to find a packet to process, the SOP bit indicates that the start of a packet has been found, eliminating another read to find the EOP bit in the preceding descriptor is set.

The INT bit is used to indicate if the packet DMA circuit 16 is to generate an interrupt when the descriptor is complete (e.g. when the packet DMA circuit 16 is writing the updated descriptor back to memory). Software may set the INT bit to cause the interrupt and clear the INT bit to not cause the interrupt.

The SWID may indicate the interface circuit (e.g. the Rx circuit 26A–26C) on which the packet was received, for input queue descriptors. The LE bit may indicate, when set, that an error was encountered in the Rx circuit 26A–26C that received the packet. In particular, if the Rx circuit is receiving SPI-4 phase 2 traffic, the LE bit may indicate, when set, that a DIP-4 error occurred. The SE bit may indicate, when set, that a SPI-4 abort control word was received in the packet or an error was detected in a PoHT transaction. The PE bit may indicate, when set, that the packet DMA circuit detected an error when transferring the packet.

The buffer length field indicates the size of the memory buffer indicated by the descriptor 102 (in bytes). For input queue descriptors, the control circuit 84 may overwrite the buffer length field to indicate the actual length used to store packet data.

The next_dest field in the descriptor is used, for output queue descriptors, to store the next_dest value for PoHT packets. The control circuit 90 may read the next_dest field and transmit the value with the packet to the Tx circuit 28A–28C that is to transmit the packet.

The VC field stores the IVC for a received packet, if the packet was transmitted on the SPI interface. For output queue descriptors, the VC field may store a value for which the most significant 4 bits are transmitted to the Tx circuit 28A–28C to transmit the packet, and the Tx circuit 28A–28C may append the bits to the OVC to generate the VC field in the SPI-4 packet. The memory buffer address field stores the address of the memory buffer indicated by the descriptor 102.

It is noted that, while various bits have been described above as having certain meanings when set or clear, the opposite meanings may be assigned to the set and clear states. Generally, any indication may be used in various embodiments.

Figure 8:
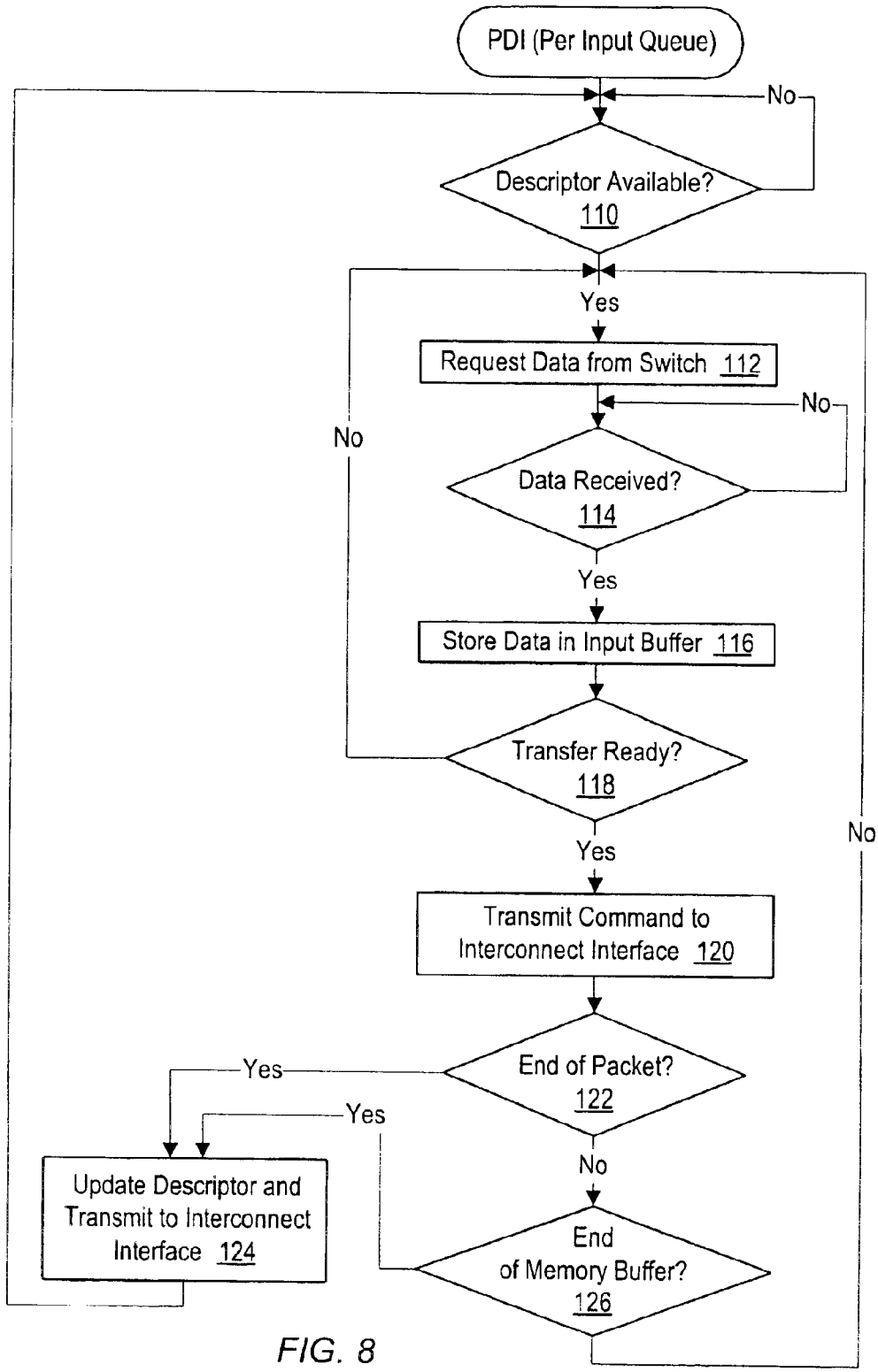
FIG. 8 is a flowchart illustrating operation of one embodiment of the input packet DMA circuit (PDI) circuitry.

Turning next to FIG. 8, a flowchart is shown illustrating operation of one embodiment of the PDI 40 (e.g. the control circuit 84 in the embodiment of FIG. 5) for one of the input queues. The PDI 40 may perform similar operations in parallel for other input queues. The blocks shown in FIG. 8 are illustrated in a particular order for ease of understanding, but any order may be used. Furthermore, blocks may be performed in parallel in the circuitry forming the PDI 40. The flowchart may represent the operation of the PDI 40 over a number of clock cycles.

The PDI 40 waits for a descriptor to become available (decision block 110). For example, in the embodiment of FIG. 7, a descriptor may be available if the HW bit is set. In other embodiments, the HW bit may indicate availability from a software point of view, but the count shown above being greater than zero may indicate that a descriptor is available to the PDI 40. If the descriptor is available, then the PDI 40 may request data from the switch 18 for the input queue (block 112) via the switch interface circuit 82, and waits for data to be received (decision block 114). In parallel (not shown in FIG. 8), the PDI 40 may prefetch additional descriptors, if desired, incrementing the prefetch index in the descriptor control registers 96A in response. Once data is received into the input buffer 88 (block 116), the PDI 40 determines if a transfer is ready to be made to memory (decision block 118). In some embodiments, the PDI 40 may attempt to accumulate data to minimize the number of write commands and to minimize read-modify-writes on the interconnect 22. In such embodiments, a transfer may be ready if the end of the packet has been reached, if the end of the memory buffer has been reached, or if a cache block boundary in the memory buffer has been reached. In other embodiments, the PDI 40 may not attempt to accumulate data or may accumulate data until one or more of the above conditions hold. In still other embodiments, if the start of the memory buffer is not aligned to a cache block boundary, the PDI 40 may write the cache block with undefined data in the portion not occupied by the memory buffer. In this manner, read-modify-write transactions may be avoided in writing the packet data to memory. Similarly, if the end of the packet does not fill a cache block, the PDI 40 may write the cache block with undefined data in the portion not occupied by the cache block.

If a transfer is ready, the PDI 40 may transmit a write command to the interconnect interface circuit 80 to write the packet data to the memory controller 14 for update into the memory 24 (block 120). The PDI 40 may retain the address of the memory buffer from the descriptor, and may modify the address after each write command has been generated to reflect the number of bytes written during the write command. Additionally, the number of bytes written may be counted by the PDI 40 to ensure that the memory buffer size is not exceeded and for update into the descriptor when the transfer to the memory buffer is complete.

If the transfer included the end of the packet (decision block 122), the PDI 40 may generate a write command to update the descriptor corresponding to the memory buffer (block 124). In this case, the PDI 40 may set the EOP bit in the descriptor, as well as clear the HW bit. If the descriptor also includes the start of the packet, the PDI 40 may set the SOP bit. The PDI 40 updates the buffer length field of the descriptor to reflect the number of packet bytes written into the memory buffer indicated by the descriptor. Finally, the PDI 40 writes the IVC for the packet into the VC field of the descriptor and may write the next_dest from the Rx circuit 26A–26C to the next_dest field of the descriptor. The PDI 40 returns to decision block 10 to determine if the next descriptor is available.

If the transfer did not include the end of the packet but the end of the memory buffer has been reached (decision block 126), the PDI 40 may generate a write command to update the descriptor (block 124). In this case, the EOP bit is clear since the end of the packet has not yet been reached. If the memory buffer includes the start of the packet, the PDI 40 sets the SOP bit. The PDI 40 clears the HW bit, may store the IVC in the VC field of the descriptor, and may write the next_dest from the Rx circuit 26A–26C to the next_dest field of the descriptor. The PDI 40 returns to decision block 110 to determine if the next descriptor is available.

In one embodiment, the flowchart of FIG. 8 may be implemented as two relatively independent operations (e.g. as two independent circuits). One circuit may check if an input queue is enabled and reads data from the switch into the input buffer if the input queue is enabled. In other words, this circuit may implement blocks 112, 114, and 116. The other circuit may check if a descriptor is available and may generate the write commands to the interconnect interface circuit 80 to write data from the input buffer to the memory. In other words, this circuit may implement blocks 110, 118, 120, 122, 124, and 126.

Figure 9:
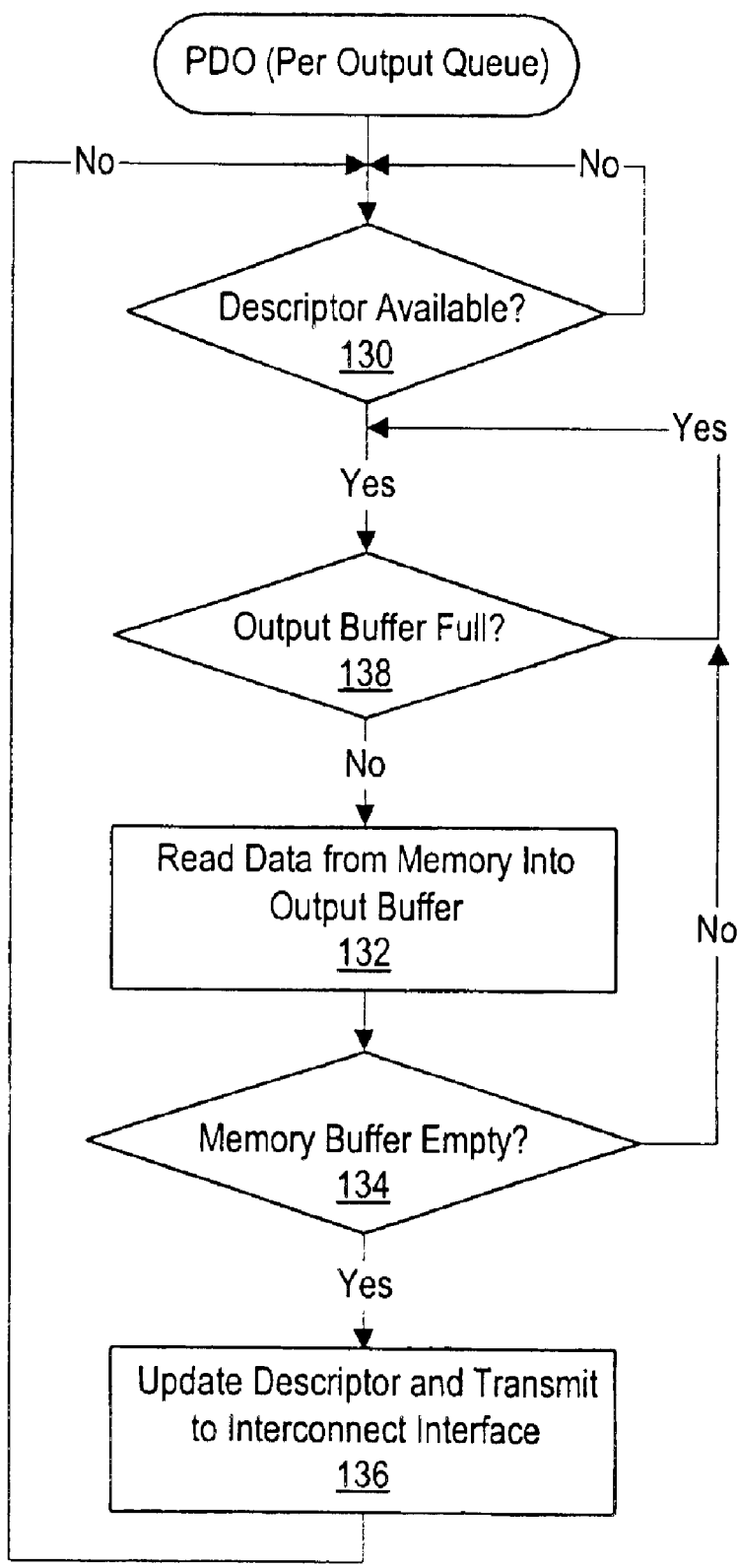
FIGS. 9 and 10 are flowcharts illustrating operation of one embodiment of the output packet DMA circuit (PDO) circuitry.
Figure 10:
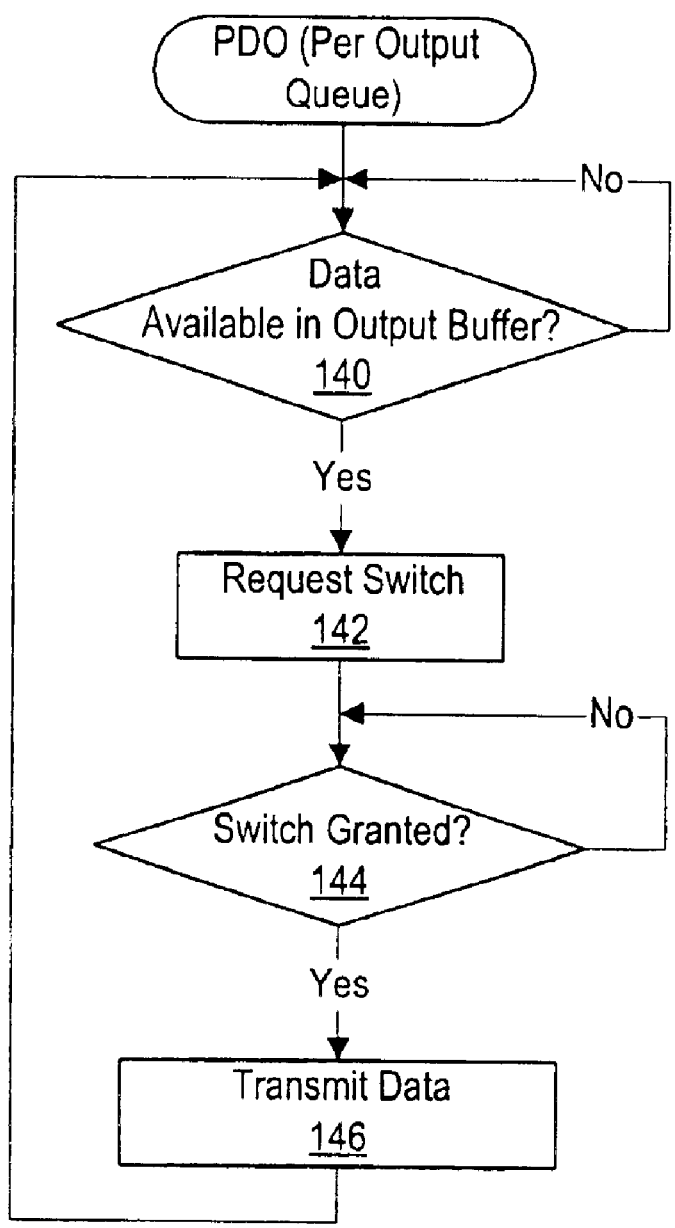

Turning now to FIGS. 9 and 10, flowcharts are shown illustrating operation of one embodiment of the PDO 42

(e.g. the control circuit 90 for the embodiment shown in FIG. 5) for one of the output queues. The PDO 42 may perform similar operations in parallel for other output queues. The blocks shown in FIGS. 9 and 10 are illustrated in a particular order for ease of understanding, but any order may be used. Furthermore, blocks may be performed in parallel in the circuitry forming the PDO 42. The flowcharts may represent the operation of the PDO 42 over a number of clock cycles (e.g. pipelined). The operation in FIG. 9 and in FIG. 10 may be performed by the PDO 42 in parallel for a given output queue.

The PDO 42 may wait for a descriptor to become available (decision block 130). For the embodiment of FIG. 7, a descriptor may be indicated as available if the HW bit is set (or alternatively if the count is greater than one, as discussed above). In the case of the output queues, a descriptor being available may generally meaning that the corresponding memory buffer is storing a packet (or a portion of a packet) to be transmitted by the corresponding Tx interface circuit 28A–28C.

If a descriptor is available, the PDO 42 may check if the output buffer 94 is full (decision block 138). If the output buffer 94 is full, the PDO 42 may wait for space in the output buffer 94 to free before reading additional packet data from memory. If a descriptor is available and the output buffer 94 is not full, the PDO 42 may read data from the memory buffer indicated by the descriptor into the output buffer 94 (block 132). More particularly, the PDO 42 may generate a read command to the interconnect interface circuit 80 to read the data from the memory buffer. If the memory buffer is empty after the read (that is, the data stored in the memory buffer has been completely read into the output buffer 94) (decision block 134), the PDO 42 may update the descriptor and transmit a write command to the interconnect interface circuit 80 to write the descriptor back to memory. In particular, the PDO 42 may clear the HW bit in the descriptor.

If the memory buffer is not empty, the PDO 42 may check if the output buffer 94 is full (decision block 138), and may continue as above.

FIG. 9 illustrates the fetching of descriptors and the fetching of packet data into the output buffer. FIG. 10 illustrates the transmission of the packet data through the switch to the Tx interface circuit 28A–28C. The PDO 42 waits for data to be available in the output buffer for transfer (decision block 140). Once data is available, the PDO 42 signals the switch interface circuit 82 to request the switch transfer (block 142). As mentioned above, the destination and OVC in that destination may be determined, in the embodiment of FIG. 5, from the PDO_map register 98. The PDO 42 waits for the switch to be granted (decision block 144), and then transfers data from the output buffer to the switch (block 146).

The descriptors and related control registers have been described above as being used to communicate between the packet DMA circuit 16 and software. Alternatively or in addition, interrupts of the processors 12A–12N by the packet DMA circuit 16 may be used to communicate. It is noted that the writing of packets to multiple memory buffers and the reading of packets from multiple memory buffers may be viewed as scatter/gather operations.

Figure 11:
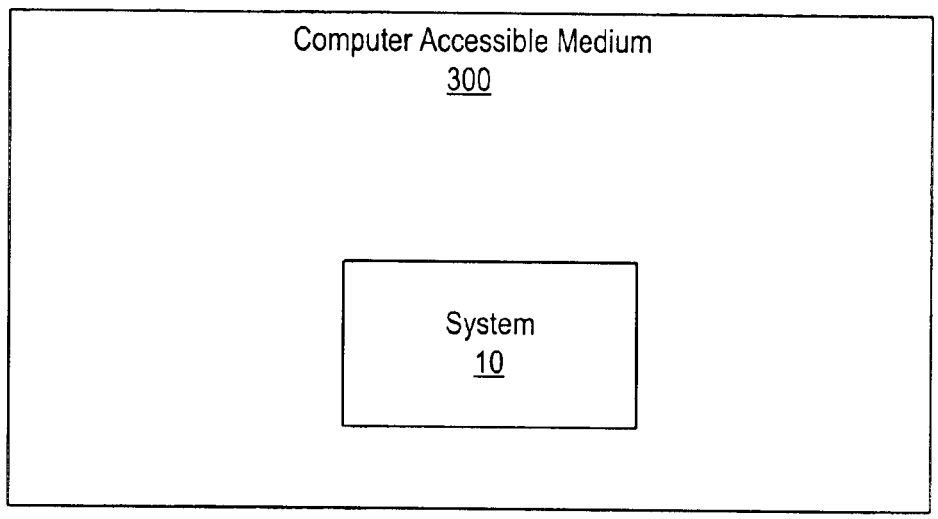
FIG. 11 is a block diagram of one embodiment of a computer accessible medium.

Turning next to FIG. 11, a block diagram of a computer accessible medium 300 including one or more data structures representative of the circuitry included in the system 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the system 10, other embodiments may include a representation of any portion of the system 10 (e.g. processors 12A–12N, memory controller 14, interconnect 22, packet DMA circuit 16 (or portions thereof), switch 18, interface circuits 22A–22C or portions thereof, etc.).

Figure 12:
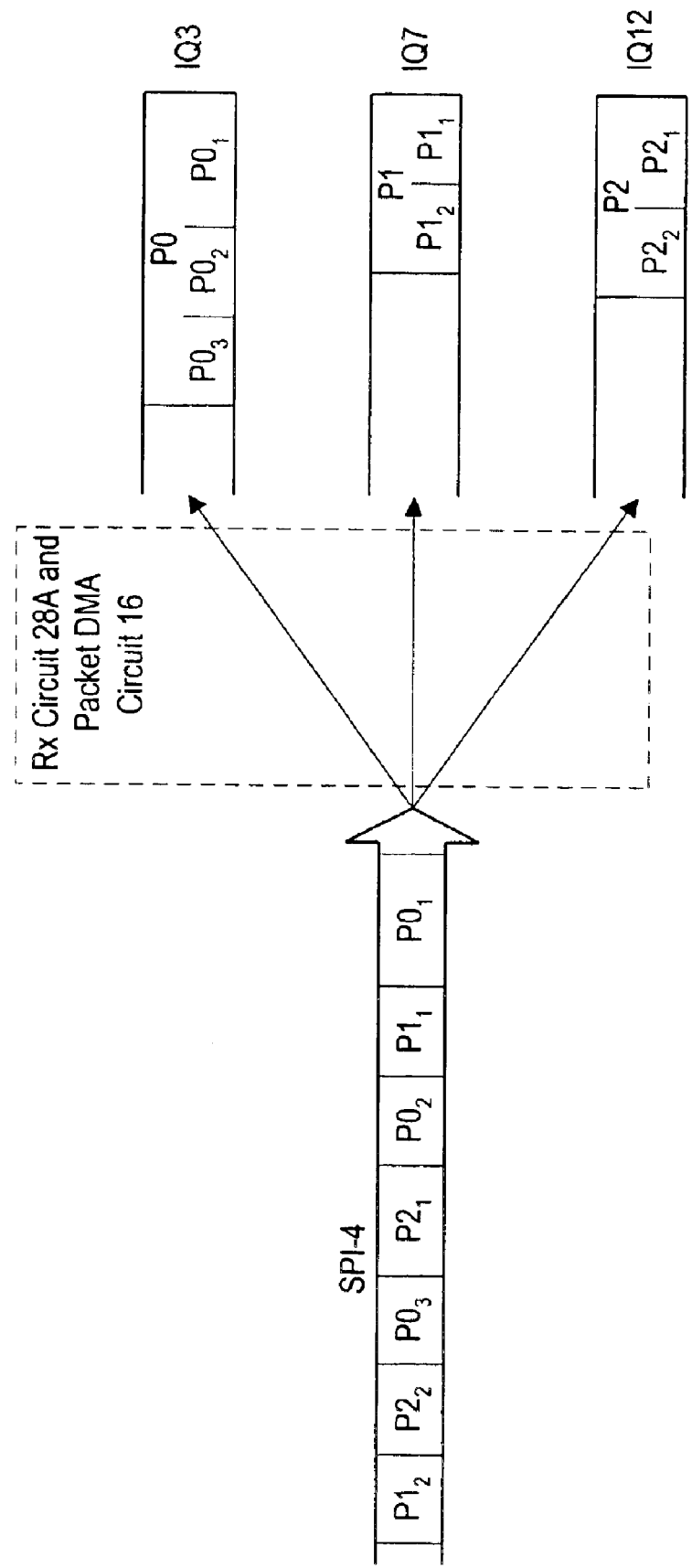
FIG. 12 is a block diagram illustrating an example of packet segmentation and reassembly.

FIG. 12 is a block diagram illustrating an example of segmentation and reassembly of packets according to one embodiment of the system 10. Illustrated in FIG. 12 is exemplary packet data transmitted on a SPI-4 interface and the packet data stored in a set of input queues of the packet DMA circuit 16. As mentioned above, the input queues may actually be implemented in the memory 24 (e.g. as a set of descriptor rings).

Generally, the above description has discussed receiving packets on the interfaces and transmitting those packets to the packet DMA circuit 16 for storage in the memory 24. Transmitters on a SPI-4 interface (e.g. the Tx circuits 28A–28C) are permitted to segment the packets into fragments for transmission, interleaving the packet fragments of different packets. For example, packets traveling in different virtual channels on the SPI-4 interface may have fragments interleaved on the SPI-4 interface. Illustrated on the SPI-4 interface in FIG. 12 is a first packet (P0) comprising packet fragments $P0_1$, $P0_2$, and $P0_3$; a second packet (P1) comprising packet fragments $P1_1$ and $P1_2$; and a third packet (P2) comprising packet fragments $P2_1$, and $P2_2$. The various fragments may be of different size (e.g. $P0_1$, is larger than $P2_1$, which is larger than the other packet fragments illustrated in FIG. 12).

In the example of FIG. 12, the packet fragment $P0_1$ is transmitted first (in time), followed by the packet fragments $P1_1$, $P0_2$, $P2_1$, $P0_3$, $P2_2$, and $P1_2$ in that temporal order. The fragments are received into the Rx circuit 28A in this example, which maps packet P0 to input queue (IQ3) in this example, packet P1 to IQ7 in this example, and packet P2 to IQ12 in this example. As the packet fragments comprising each packet are received, the Rx circuit 28A transmits the packet fragments on their respective SVCs to the packet DMA circuit 16. The packet DMA circuit 16 writes the packet fragments to the specified input queues, and thus the packet fragments are reassembled in the input queues for processing (packet P0 in IQ3, packet P1 in IQ7, and packet P2 in IQ12).

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a first interface circuit configured to operate as a first interface for the integrated circuit to receive and send data packets external to the integrated circuit;
   a second interface circuit configured to operate as a second interface for the integrated circuit to receive and send data packets external to the integrated circuit;
   a memory controller configured to interface to a memory;
   a direct memory access (DMA) circuit coupled to receive data packets from the first and second interface circuits and to perform direct memory access operation in response to a write command to the memory controller to write received data packets in to the memory, wherein the DMA circuit includes an input circuit to map received data packets from the first and second interface circuits into logical input queues; and
   a switch coupled to the DMA circuit and to the first and second interface circuits to switch between the first and second interface circuits for coupling to the DMA circuit to allow one DMA circuit to be employed in the integrated circuit to process multiple data interfaces of the integrated circuit, the switch to have multiple switch virtual channels to switch data packets from the first and second interface circuits to one or more logical input queues to allow data packets from the first and second interface circuits to be mapped into separate queues or merged into a selected input queue.

2. The integrated circuit as recited in claim 1 wherein the DMA circuit to generate a read command to the memory controller to read data packets from the memory, wherein the DMA circuit includes an output circuit to map data packets from logical output queues to the first and second interface circuits, and to send data packets to the first or second interface circuit through switching operation of the switch, the switch to use the multiple switch virtual channels to switch data packets from the logical output queues to the first and second interface circuits.

3. The integrated circuit as recited in claim 2 wherein one of the two interfaces is a HyperTransport interface.

4. The integrated circuit as recited in claim 2 wherein one of the two interfaces is a system packet interface.

5. The integrated circuit as recited in claim 2 wherein each logical input queue is associated with a descriptor ring comprising a plurality of descriptors, each of the plurality of descriptors identifying a memory buffer in the memory for storing a data packet received into a respective input queue.

6. The integrated circuit as recited in claim 2 wherein each logical output queues is programmably mapped to a virtual channel of the first or second interface circuit.

7. The integrated circuit as recited in claim 2 further comprising a third interface circuit configured to operate as a third interface for the integrated circuit to receive and send data packets external to the integrated circuit, wherein the DMA circuit is also coupled to perform data packet transfer to and from the third interface circuit through the multiple switch virtual channels of the switch.

8. The integrated circuit as recited in claim 1 wherein the selected input queue is shared between the first interface circuit and the second interface circuit.

9. A computer accessible medium comprising one or more data structures to manufacture an integrated circuit, the integrated circuit representing:
   a first interface circuit configured to operate as a first interface for the integrated circuit to receive and send data packets external to the integrated circuit;
   a second interface circuit configured to operate as a second interface for the integrated circuit to receive and send data packets external to the integrated circuit;
   a memory controller configured to interface to a memory;
   a direct memory access (DMA) circuit coupled to receive data packets from the first and second interface circuits and to perform direct memory access operation in response to a write command to the memory controller to write received data packets in to the memory, wherein the DMA circuit includes an input circuit to map received data packets from the first and second interface circuits into logical input queues; and
   a switch coupled to the DMA circuit and to the first and second interface circuits to switch between the first and second interface circuits for coupling to the DMA circuit to allow one DMA circuit to be employed in the integrated circuit to process multiple data interfaces of the integrated circuit, the switch to have multiple switch virtual channels to switch data packets from the first and second interface circuits to one or more logical input queues to allow data packets from the first and second interface circuits to be mapped into separate queues or merged into a selected input queue.

10. The computer accessible medium as recited in claim 9 wherein the DMA circuit to generate a read command to the memory controller to read data packets from the memory, wherein the DMA circuit includes an output circuit to map data packets from logical output queues to the first and second interface circuits, and to send data packets to the first or second interface circuit through switching operation of the switch, the switch to use the multiple switch virtual channels to switch data packets from the logical output queues to the first and second interface circuits.

11. A method comprising:
   receiving a first data packet into a first interface of an integrated circuit;
   receiving a second data packet into a second interface of the integrated circuit;
   switching the first data packet through one or more virtual channels of a switch to transfer the first data packet to a logical input queue of a direct memory access (DMA) device to access a memory in a write operation using direct memory access to store the first data packet;
   switching the second data packet through the one or more virtual channels of the switch to transfer the second data packet to a logical input queue of the DMA device to access the memory in a write operation using direct memory access to store the second data packet, the switching of the first and second data packets through the one or more virtual channels to allow the first and second data packets from the first and second interfaces to be mapped into separate queues or merged into a selected input queue.

12. The method as recited in claim 11 further comprising switching a third data packet from the memory to one of the first or second interface through one or more virtual channels of the switch in a read operation using direct memory access to transfer the third data packet from a logical output queue to one of the first or second interface and switching a fourth data packet from the memory to one of the first or second interface through one or more virtual channels of the switch in a read operation using direct memory access to transfer the fourth data packet from a logical queue to one of the first or second interface, the switching of the third and fourth data packets allowing the DMA device to process data packets to and from multiple interfaces of the integrated circuit through selective switching of the virtual channels of the switch.

13. The method as recited in claim 12 further comprising switching one or more virtual channels to allow the first interface and the second interface to communicate with each other to allow data packet transfer between the two interfaces.

* * * * *